United States Patent
Pursifull

(10) Patent No.: US 6,588,260 B1
(45) Date of Patent: Jul. 8, 2003

(54) ELECTRONIC THROTTLE DISABLE CONTROL TEST SYSTEM

(75) Inventor: Ross Dykstra Pursifull, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 70 days.

(21) Appl. No.: 09/695,165

(22) Filed: Oct. 24, 2000

(51) Int. Cl.$^7$ .............................................. G01M 15/00
(52) U.S. Cl. ...................................................... 73/118.1
(58) Field of Search ............................... 73/116, 117.2, 73/117.3, 118.1, 118.2

(56) References Cited

U.S. PATENT DOCUMENTS

| | | | |
|---|---|---|---|
| 4,359,894 A | * 11/1982 | Ikeura et al. ............... | 73/118.2 |
| 4,515,009 A | * 5/1985 | Hasegawa et al. .......... | 123/478 |
| 5,088,461 A | * 2/1992 | Ohashi et al. .............. | 123/353 |
| 5,473,936 A | * 12/1995 | Sasakura et al. ........... | 73/117.3 |
| 5,950,597 A | * 9/1999 | Kamio et al. ............... | 123/397 |
| 6,318,337 B1 | * 11/2001 | Pursifull ..................... | 123/396 |

* cited by examiner

Primary Examiner—Eric S. McCall
(74) Attorney, Agent, or Firm—John Kajander

(57) ABSTRACT

A method for testing the integrity of an electronic throttle disable function begins by disabling the drive electronics responsible for controlling the throttle motor. The microcontroller doing the plate position control commands full closing voltage from throttle motor drive electronics (while those electronics are disabled). Then the throttle position voltage is recorded. If the disable system is working, the H-driver will output zero volts even though a full motor closing voltage is requested. The throttle position voltage is then compared to a predetermined default throttle position voltage. If there is a significant difference between the two voltages, then failure mode management is engaged.

17 Claims, 2 Drawing Sheets

ELECTRONIC THROTTLE DISABLE CONTROL TEST SYSTEM

TECHNICAL FIELD

The present invention relates generally to control systems for internal combustion engines, and more particularly, to an electronic throttle disable control test system.

BACKGROUND ART

Many previously known motor vehicle throttle controls have a direct physical linkage between an accelerator pedal and the throttle body so that the throttle plate is pulled open by the accelerator cable as the driver presses the pedal. The direct mechanical linkage includes biasing that defaults the linkage to a reduced operating position, also known as idle, in a manner consistent with regulations. Nevertheless, such mechanisms are often simple and unable to adapt fuel consumption efficiency, minimize regulated emissions, improve driveability to changing traveling conditions, and add significant weight and components to the motor vehicle.

An alternative control for improving throttle control and the efficient introduction of fuel air mixtures into the engine cylinders is presented by electronic throttle control. The electronic throttle control includes a throttle control unit that positions the throttle plate by an actuator controlled by a microprocessor using position feedback sensors. The micro controllers (or micro processors) are often included as part of a powertrain electronic control that can adjust the fuel and air intake and ignition in response to changing conditions of vehicle operation as well as operator control. Protection may be provided so that an electronic system does not misread or misdirect the control and so that unintended operation is avoided when portions of the electronic control suffer a failure.

One previously known type of protection to avoid unintended actuation of excessive throttle is to use a disable function of the electronic throttle drive electronics. The disable function allows the PCM to shut down the electronic throttle drive electronics in the event that the PCM senses a throttle position differing from expected throttle position. Unfortunately, typical electronic throttle systems do not test the integrity of the disable function.

The disadvantages associated with these conventional electronic throttle disable techniques have made it apparent that a new technique for testing the electronic throttle disable function is needed. The new technique should not intrude on normal throttle operation while verifying function integrity at least once each time the vehicle is powered up. The present invention is directed to these ends.

SUMMARY OF THE INVENTION

It is, therefore, an object of the invention to provide an improved and reliable electronic throttle disable control test system. Another object of the invention is to test the electronic throttle driver disable function. And additional object of the invention is to not intrude upon normal throttle operation.

In accordance with the objects of this invention, an electronic throttle disable control test system is provided. In one embodiment of the invention, a method for testing the integrity of an electronic throttle disable function begins by disabling the electronic throttle motor's drive electronics (which is an integrated H-driver in the preferred embodiment). The H-driver is commanded to apply dull closing voltage, however, since the H-driver is disabled, no voltage is applied to the motor and the throttle remains at its default position. The throttle position voltage is then compared to a predetermined default position voltage. If there is a significant difference between the two voltages, then failure mode management is engaged. These voltages can be either "absolute" meaning relative to system ground or "relative" meaning relative to the throttle position sensor voltage output at closed throttle, default position, or open stop position. This allows one to detect the voltage difference between default and closed stop.

At this point, we have verified that the throttle does not move when disabled. Then we have to verify that it does move when enabled.

The present invention thus achieves an improved electronic throttle disable control test system. The present invention is advantageous in that the integrity of the electronic throttle disable function is tested at least once each time the vehicle is powered up.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
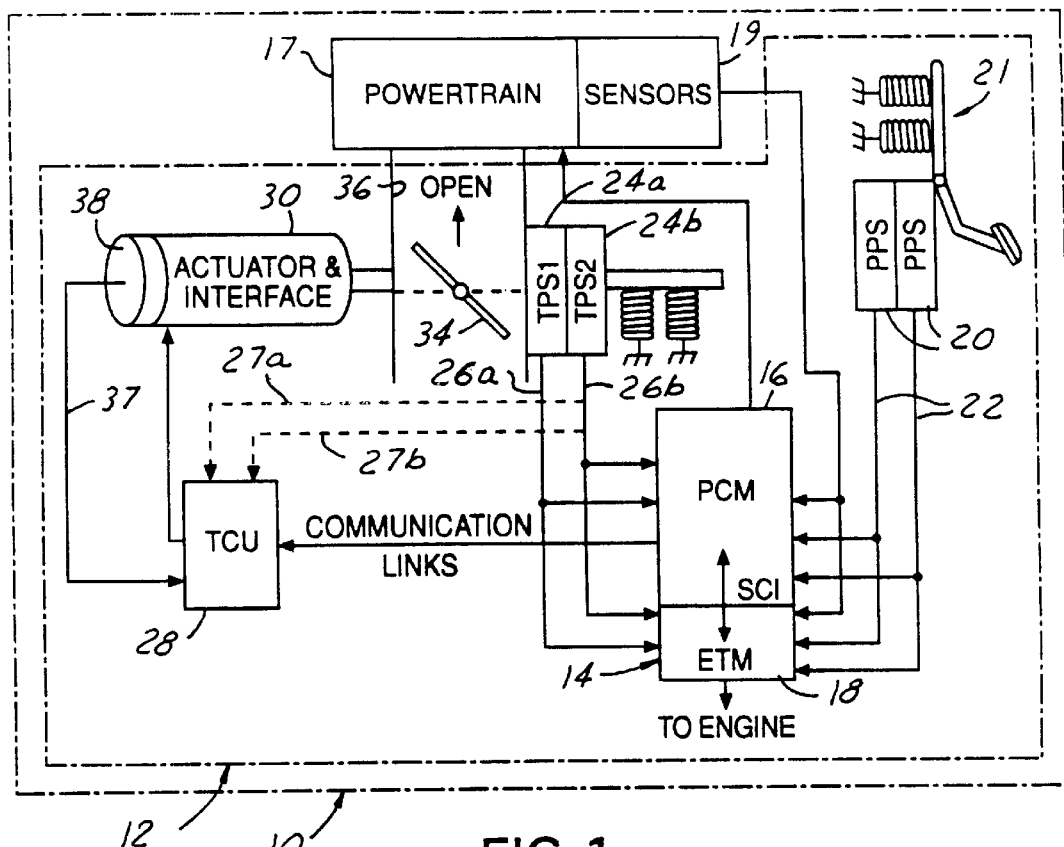
FIG. 1 is an electronic throttle disable control test system in accordance with one embodiment of the present invention.

In the following figures, the same reference numerals will be used to identify identical components in the various views. The present invention is illustrated with respect to an electronic throttle disable control test system, particularly suited for the automotive field. However, the present invention is applicable to various other uses that may require electronic throttle disable control test systems.

Referring to FIG. 1, a motor vehicle powertrain system 10 including electronic throttle control system 12 includes an electronic control unit 14. In the preferred embodiment, the electronic control unit 14 includes a powertrain control module (PCM) 16 including a main processor and an electronic throttle monitor (ETM) 18 including an independent processor. The PCM and ETM share sensors 19 and actuators that are associated with the powertrain system 17 and control module 16. Preferably, the electronic throttle monitor 18 includes a processor physically located within the powertrain control module housing, although a separate housing, separate locations and other embodiments can also be employed in practicing the invention. Moreover, while the electronic throttle monitor 18 and the powertrain control module 16 have independent processors, they share the inputs and outputs of powertrain sensors 19 and actuators 21 and 34, respectively, for independent processing.

A wide variety of inputs are represented in the FIG. 1 diagram by the diagrammatic representation of redundant pedal position sensors 20. The sensors 20 are coupled through inputs 22 and are representative of many different driver controls that may demonstrate the demand for power. In addition, the electronic control unit 14 includes inputs 26a and 26b for detecting throttle position. A variety of ways for providing such indications is diagrammatically represented in FIG. 1 by a first throttle position sensor 24a and a redundant second throttle position sensor 24b to obtain a power output indication. As a result of the many inputs represented at 19, 22, 26a and 26b, the electronic controller 14 provides outputs for limiting output power so that output power does not exceed power demand. A variety of outputs are also diagrammatically represented in FIG. 1 by the illustrated example of inputs to a throttle control unit 28 that in turn powers an actuator and motive interface 30 for displacing the throttle plate 34. For example, an actuator and interface may comprise redundant drive motors powering a gear interface to change the angle of the throttle plate 34 in the throttle body 36.

Likewise, the responsive equipment like motors may also provide feedback. For example, the motor position sensor 38 or the throttle position sensors 24a and 24b may provide feedback to the throttle control unit 28, as shown at 37, 27a and 27b, respectively, to determine whether alternative responses are required or to maintain information for service or repair.

The purpose of the present invention is to establish a method with which to test the ability to take an action (which is taken upon failure detection). For a number of detected electronic control system failures, the throttle plate 34 position control disables the drive electronics for the throttle motor 30. In normal operation, the system would never take this action.

The challenge is to design a test that does not intrude in normal throttle control operation. Since disabling the driver results in the plate 34 going to default, to test this function non-intrusively, one must test when the system is off-line but powered (initialization or shut-down) or when default is requested anyway. An advantage over previous technology is that the driver disable function (which is a significant contributor to system predictability when a system failure is detected) can now be tested at least once each time the vehicle is powered up.

Figure 2:
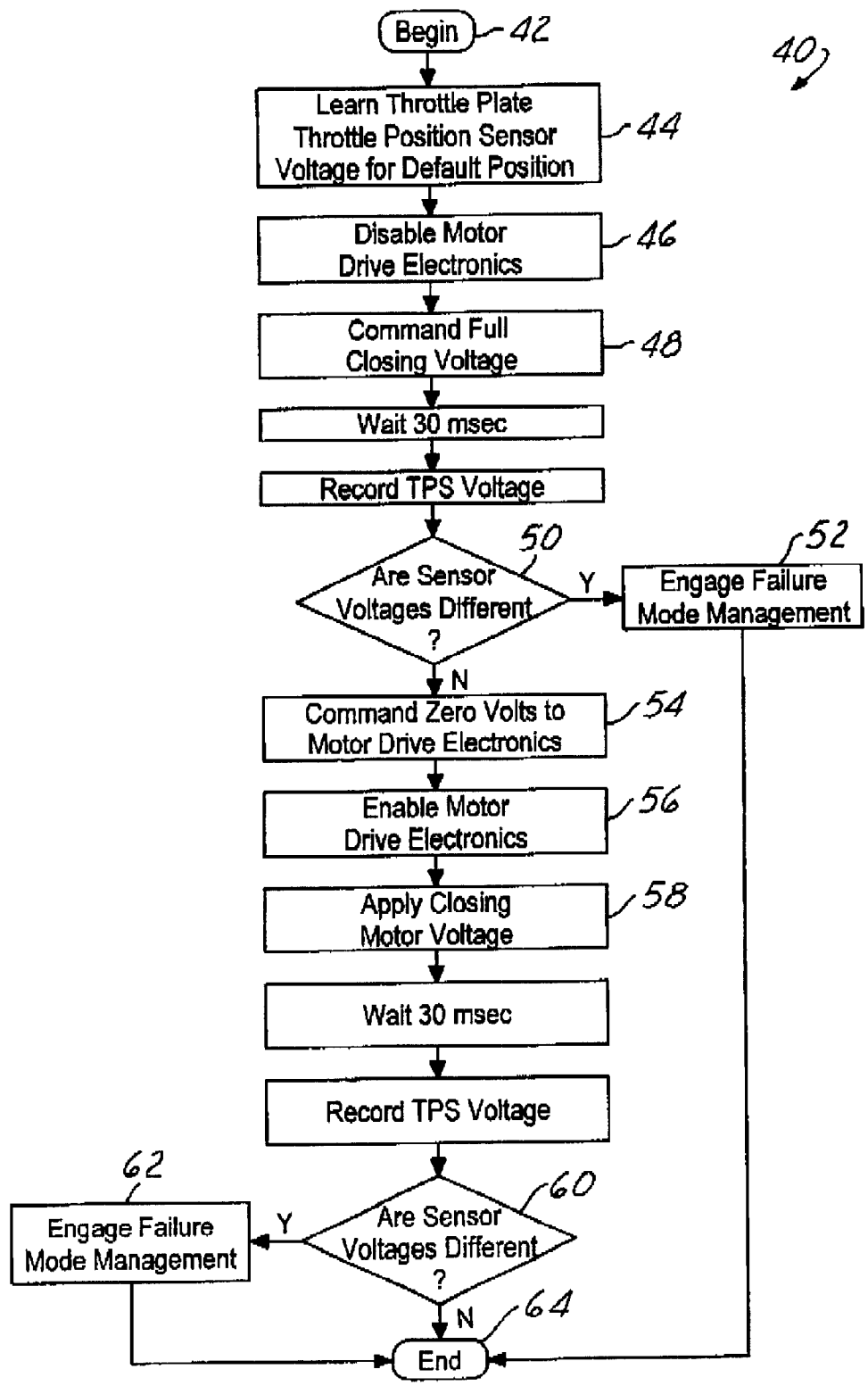
FIG. 2 is a flow chart for an electronic throttle disable control test in accordance with one embodiment of the present invention.

Referring to FIG. 2, a flow chart for an electronic throttle disable control test 40 in accordance with one embodiment of the present invention is illustrated. In the present invention, control test 40 begins with step 42 and immediately proceeds to step 44 where PCM 16 learns the TPS output voltage for the default position of throttle plate 36. (At this point, no motor voltage is applied so that the plate will have attained the default position.) The sequence then proceeds to step 46.

In step 46, PCM 16 disables the drive electronics responsible for actuating motor 30. The sequence then proceeds to step 48 where PCM 16 commands full closing motor voltage. PCM 16 waits approximately 30 milliseconds and then records the resulting throttle position sensor voltage. The sequence then proceeds to step 50.

In step 50, the throttle position voltage corresponding to the default position of throttle plate 34, determined in step 44, is compared to the throttle position voltage obtained after disabling the drive electronics. If the two voltages are significantly different, it means that the motor drove the plate to a new position and the disable function is not working and then the PCM 16 will engage failure mode management in step 52 and proceed to the end of the sequence 64. If, however, the two voltages are not significantly different, then the sequence proceeds to step 54.

In step 54, PCM 16 commands zero volts and proceeds to step 56 where it enables the H-driver. In step 58 PCM 16 applies approximately five volts in the closing direction to throttle motor 30. PCM 16 then waits 30 milliseconds before applying full voltage in the closing direction to throttle motor 30. PCM 16 then waits another 30 milliseconds before learning the output voltage corresponding to a close stop of throttle plate 34. PCM 16 then records the close stop TPS output voltage and the sequence proceeds to step 60.

In step 60, the voltage corresponding to the default position of throttle plate 34, determined in step 44, is compared to the close stop voltage obtained in step 58. If the two voltages are not significantly different, then the sequence proceeds to end step 64. If, however, the two voltages are significantly different, then throttle plate 34 may be potentially frozen. In this case, PCM 16 engages failure mode management in step 62, including ice breaking strategy.

While the present invention is shown with respect to testing the integrity of the drive electronics disable function after learning the default voltage corresponding to the default position of throttle plate 34, one skilled in the art would realize that testing may also occur before learning the default voltage by simply comparing the voltage obtained in step 48 with the close stop voltage. One skilled in the art would also recognize that various routine functions, such as checking memory, may occur before or after the test.

The present invention thus achieves an improved and reliable electronic throttle disable control test system by means to test the disable function without intruding on normal throttle operation. The present invention does this at least once each time the vehicle is powered up.

From the foregoing, it can be seen that there has been brought to the art a new and improved electronic throttle disable control test system. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An electronic throttle control apparatus for testing integrity of a motor drive electronics disable feature comprising:
   a PCM having drive electronics for controlling a motor coupled to an electronic throttle plate, said PCM having control logic to disable said drive electronics and return said electronic throttle plate to a default position, determine a default throttle position sensor (TPS) output voltage corresponding to said default position, command a full closing motor voltage, compare a full closing TPS output voltage to said default TPS output voltage, and engage failure mode management when said full closing TPS output voltage and said default TPS output voltage are significantly different from each other.

2. The electronic throttle control apparatus of claim 1, wherein said PCM further includes control logic operative to enable said drive electronics.

3. The electronic throttle control apparatus of claim 1, wherein said PCM further includes control logic operative to apply close stop voltage to said motor.

4. The electronic throttle control apparatus of claim 3, wherein said PCM further includes control logic operative to compare said full closing TPS output voltage to said close stop TPS output voltage.

5. The electronic throttle control apparatus of claim 4, wherein said PCM includes control logic operative to engage failure mode management when said full closing TPS output voltage and said close stop TPS output voltage are significantly different.

6. The electronic throttle control apparatus of claim 1, wherein said PCM includes control logic operative to test said motor drive electronics disable feature before leaning said default throttle position sensor output voltage.

7. The electronic throttle control apparatus of claim 1, wherein said PCM includes control logic operative to test said motor drive electronics disable feature before checking PCM memory.

8. An electronic throttle control test system for an automobile having and internal combustion engine, said system comprising:
   a motorized throttle located on the internal combustion engine, said motorized throttle having a throttle plate coupled to a motor for controlling an amount of airflow entering the internal combustion engine; and
   a PCM having drive electronics for controlling said motor coupled to said throttle plate, said PCM having control, logic to disable said drive electronics such that said throttle plate returns to or remains at a default position, determine a default throttle position sensor (TPS) output voltage corresponding to said default position, command a full closing motor voltage, compare said full closing TPS output voltage to said default TPS output voltage, and engage failure mode management when said full closing TPS output voltage and said predetermined default TPS output voltage are significantly different.

9. The electronic throttle control test system of claim 8, wherein said PCM includes control logic operative to test disabling of said drive electronics before learning said default throttle position sensor output voltage.

10. The electronic throttle control test system of claim 8, wherein said PCM includes control logic operative to test disabling of said drive electronics before checking PCM memory.

11. A method for testing integrity of an electronic throttle plate driver disable function controlled by a powertrain control module (PCM) comprising the steps of:
    disabling said driver;
    determining a first throttle position value with said driver disabled;
    commanding full closing voltage;
    determining a second throttle position value at said full closing voltage;
    comparing said first and second throttle position values; and
    engaging failure mode management when said first and second throttle position values are significantly different.

12. The method of claim 11, further comprising the step of enabling said driver.

13. The method of claim 11, further comprising the step of applying close stop output voltage to a motor.

14. The method of claim 13, further comprising the step of comparing a throttle position sensor (TPS) output voltage at said full closing voltage to a TPS output voltage at said close stop voltage.

15. The method of claim 14, further comprising the step of engaging failure mode management when said TPS output voltage at said full closing voltage and said TPS output voltage at said close stop voltage are significantly different.

16. The method of claim 11, wherein said testing occurs before learning default throttle position sensor output voltage.

17. The method of claim 11, wherein said testing occurs before checking PCM memory.

* * * * *